US012443864B2

(12) United States Patent
Ron et al.

(10) Patent No.: US 12,443,864 B2
(45) Date of Patent: Oct. 14, 2025

(54) DYNAMIC RESPONSE PREDICTION FOR IMPROVED BOT TASK PROCESSING

(71) Applicant: LIVEPERSON, INC., New York, NY (US)

(72) Inventors: Ofer Ron, Tel Aviv (IL); Eran Vanounou, Tel Aviv (IL); Gali Konky, Tel Aviv (IL); Seetvun Amir, Tel Aviv (IL)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/731,623

(22) Filed: Jun. 3, 2024

(65) Prior Publication Data
US 2025/0005398 A1    Jan. 2, 2025

Related U.S. Application Data

(63) Continuation of application No. 17/901,958, filed on Sep. 2, 2022, now Pat. No. 12,026,634, which is a
(Continued)

(51) Int. Cl.
*G06N 5/04* (2023.01)
*G06N 3/044* (2023.01)
(Continued)

(52) U.S. Cl.
CPC ............. *G06N 5/04* (2013.01); *G06N 3/044* (2023.01); *G06N 3/045* (2023.01); *G06N 3/08* (2013.01); *G06N 20/00* (2019.01); *G06Q 10/10* (2013.01); *G06Q 10/107* (2013.01); *H04L 51/02* (2013.01); *H04L 51/216* (2022.05); *H04L 67/02* (2013.01); *H04L 67/63* (2022.05); *G06N 3/04* (2013.01); *G06N 7/01* (2023.01); *G06N 20/10* (2019.01)

(58) Field of Classification Search
CPC ......... H04L 51/02; H04L 67/63; H04L 37/02; G06N 5/044; G06N 5/08; G06N 5/04; G06N 20/00; G06N 3/045
USPC ................................................ 709/11; 706/11
See application file for complete search history.

(56) References Cited

U.S. PATENT DOCUMENTS 10,902,215 B1 *   1/2021   Zhang ..................... G06F 40/35
2011/0252011 A1 * 10/2011  Morris .................... H04L 51/52
                                                                707/706
(Continued)

*Primary Examiner* — Yves Dalencourt
*Assistant Examiner* — Kidest Mendaye
(74) *Attorney, Agent, or Firm* — POLSINELLI LLP

(57) ABSTRACT

Systems and methods can be provided for predicting responses during communication sessions with network devices. In some implementations, systems and methods can facilitate predicting responses using machine learning techniques. Messages received through a platform can be stored in a repository. A machine learning model may be trained using the stored messages. When a terminal device is communicating with a network device in a communication session, the messages exchanged in the communication session and the machine learning model can be used to predict future responses in real-time. The predicted future responses can be presented at the terminal device. A predicted response can be selected at the terminal device. Upon selection, the selected predicted response is transmitted to the network device during the communication session.

20 Claims, 15 Drawing Sheets

Related U.S. Application Data continuation of application No. 15/971,708, filed on May 4, 2018, now Pat. No. 11,468,344.

(60) Provisional application No. 62/502,572, filed on May 5, 2017, provisional application No. 62/502,535, filed on May 5, 2017.

(51) Int. Cl.
*G06N 3/045* (2023.01)
*G06N 3/08* (2023.01)
*G06N 20/00* (2019.01)
*G06Q 10/10* (2023.01)
*G06Q 10/107* (2023.01)
*H04L 51/02* (2022.01)
*H04L 51/216* (2022.01)
*H04L 67/02* (2022.01)
*H04L 67/63* (2022.01)
*G06N 3/04* (2023.01)
*G06N 7/01* (2023.01)
*G06N 20/10* (2019.01)

(56) References Cited

U.S. PATENT DOCUMENTS

| | | | |
|---|---|---|---|
| 2016/0162779 A1* | 6/2016 | Marcus | G06N 20/10 706/12 |
| 2017/0018015 A1* | 1/2017 | Varma | G06Q 30/0613 |
| 2017/0091274 A1* | 3/2017 | Guo | G06F 16/285 |
| 2017/0262529 A1* | 9/2017 | Chim | G06F 16/3329 |
| 2018/0121808 A1* | 5/2018 | Ramakrishna | H04L 51/02 |
| 2018/0181558 A1* | 6/2018 | Emery | H04L 51/02 |
| 2018/0357531 A1* | 12/2018 | Giridhari | G06F 18/24 |
| 2020/0293873 A1* | 9/2020 | Dai | G06F 40/279 |

* cited by examiner

DYNAMIC RESPONSE PREDICTION FOR IMPROVED BOT TASK PROCESSING

CROSS-REFERENCE TO RELATED APPLICATIONS

This application is a continuation of U.S. patent application Ser. No. 17/901,958 filed Sep. 2, 2022, which is a continuation of U.S. patent application Ser. No. 15/971,708 filed May 4, 2018, which claims the priority benefit of each of (1) U.S. Provisional Patent Application No. 62/502,535 filed on May 5, 2017, and (2) U.S. Provisional Patent Application No. 62/502,572 filed on May 5, 2017, the disclosures of each of which are hereby incorporated by reference in its entirety for all purposes.

FIELD

The present disclosure relates generally to facilitating routing of communications. More specifically, techniques are provided to dynamically routing messages between bots and terminal devices during communication sessions configured with multi-channel capabilities.

BACKGROUND

Bot scripts can be executed to automate data processing and task management. However, as the amount of data grows in scale and becomes increasingly dynamic and complex, traditional bot scripts exhibit a significant lack of efficiency. Configuring bot scripts to correctly detect target outcomes for task management is often challenging. Further, bot scripts may erroneously process tasks in a queue, and as a result, overall system load can become unbalanced or processing resources can become unduly burdened. Bot scripts are also typically incapable of processing tasks across multiple different environments.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure provide technical solutions to address the technical challenges presented above. For example, a bot (e.g., a bot script executing using a processor) may be configured to route data packets (e.g., communications, messages including content, signals, and the like) between network devices and terminal devices. Bots may be configured to be coding language agnostic. For example, bots may be coded to use Application Programming Interfaces (APIs) to interaction with systems, and therefore, may be coded in any language which is capable of making API calls. As the scale of messages to be routed grows (e.g., to big-data levels of scale and complexity), the bot may incorrectly route a message to a destination system. As a non-limiting example, bots may evaluate content of a communication (e.g., a message in a communication session) received from a network device to determine a destination for the communication. The evaluation may cause the bot to route the communication to a terminal device based on a previous routing instance. However, the target destination (e.g., a terminal device operated by an agent) may be different from the destination that received the communication in the previous routing instance. One reason may be the context of the communication as compared to previous communications from that network device. Incorrect routing can cause the network or system load to become unbalanced, and unbalanced system load may cause unnecessary burdens to processing resources (e.g., servers may overload and fail to operate, queues may become overloaded causing delay, and so on). Certain embodiments of the present disclosure provide artificial intelligence techniques and/or machine learning techniques that continuously monitor the accuracy of bot-based routing and provide feedback signals to enhance the bots' accuracy, as needed. In the above-described scenario, for example, artificial intelligence techniques and/or machine learning techniques can be implemented to enhance the bot's accuracy of future routing instances based on machine-learning models.

Certain embodiments relate to systems and methods for dynamically switching between bots and terminal devices (e.g., operated by live agents) during communication sessions between network devices (e.g., user devices operated by users) and the terminal devices. In some implementations, bots can be configured to autonomously communicate with network devices. Further, bots can be configured for a specific capability. Non-limiting examples of capabilities can include intelligently routing communications to target destinations, modifying data stored in databases, providing updates to users, providing additional information about the user to agents, determining a user's intent and routing the user to a destination system based on the intent, predicting or suggesting responses to agents communicating with users, and escalating communication sessions between bots and one or more terminal devices. In some implementations, while a bot is communicating with a network device in a communication session (e.g., a Short Message Service (SMS), in-app chat feature of a native application, or web-based chat session), a communication server can automatically and dynamically determine to transfer the chat session to a terminal device associated with an agent. For example, bots can communicate with network devices about certain tasks (e.g., tasks, such as receiving updated information and updating a record stored in a database), whereas, terminal devices can communicate with network devices regarding more difficult tasks (e.g., solving a technical issue). In a single communication session, the bot, which may be communicating with a user, a communication server can dynamically switch between the bot and a terminal device, so that the terminal device can communicate with the network device in lieu of or in addition to the bot. Advantageously, the communication session can dynamically switch between the bot and the terminal device to improve the balance of tasks associated with the terminal device.

In some implementations, bots can be configured to automatically and autonomously process tasks in and/or across multiple environments. As a non-limiting example, a communication server may be configured to establish or facilitate the establishment of an SMS text-based communication channel between a mobile device operated by a user (e.g., the network device) and a desktop computer operated by an agent (e.g., the terminal device). The communication server can transform input received from the desktop computer (e.g., key strokes) to SMS text messages and transmit the SMS text message to the user's mobile phone. During the communication session, a bot may assist the agent in communicating with the user, or the bot may take control of the conversation and communicate directly with the user using the communication channel. However, during the conversation between the agent (or bot) and the user, the user may indicate that he or she would like to continue communicating using a different communication channel, for example, a native application with chat messaging capability, instead of the SMS application currently being used. The communication server may automatically detect the user's indication to change communication channels. Further, the communication server may automatically transmit a message from the native application to the user's mobile phone to continue the conversion over the new communication channel (e.g., the chat communication session using the native application chat capability). In some implementations, the indication that the user would like to change communication channels (while continuing the existing communication session) may be automatically detected when the communication server receives a message from the mobile device through the native application. Receiving a message using a new communication channel (e.g., different from an existing communication channel used during an existing communication session) may notify the communication server to continue the communication session on the new communication channel. Advantageously, the communication server can support continuity between various communication channels by continuing a communication session autonomously and automatically across different communication channels.

In some implementations, the communication server may include or access a message recommendation system to recommend response messages to terminal devices. For example, during a communication session, the message recommendation system may continuously evaluate the messages received from the network device and/or the messages transmitted by the terminal device. The content of the message may be evaluated using machine-learning techniques to predict a response message for recommending to the terminal device operated by the agent. In some implementations, a plurality of previous messages (received from any network device or transmitted by any terminal device) may be stored in a database. Machine-learning algorithms may be executed using the messages stored in the database to identify patterns within the stored messages (e.g., one or more clustering techniques may be used to cluster messages with certain similarities). All or less than all of the messages may be tagged with an attribute. For example, an attribute tag may be code that is appended to a message (or otherwise stored in association with the message), and the attribute tag may be a characteristic of the content of the message. In some examples, the tag may be a particular string of code that is appended to the message. In some implementations, supervised machine-learning techniques may be used to train a model that recommends a response message to a particular message based on the tagged messages.

In some implementations, as the terminal device associated with the agent communicates with the network device during a communication session, the message recommendation system can query database(s) to provide the agent with additional data. For example, during a communication session, the network device may transmit a communication, indicating that the user (operating the network device) is experiencing a technical issue with a particular device. As the message is received at the communication server, the message recommendation system evaluates the message to determine that the technical issue corresponds to the particular device. For example, text-based evaluation may be performed by the communication server to determine the content of the message. The message recommendation system can automatically and autonomously query a database for technical documents relating to the particular device. The results of the query can automatically be displayed on the terminal device to assist the agent in responding to the user. Advantageously, the message recommendation system can automatically, autonomously, and continuously query databases as messages are received at the communication server during communication sessions.

In some implementations, determining whether to transfer a communication session between a bot and a terminal device can be based on an analysis of one or more characteristics of the communications exchanged during the communication session. Further, a dynamic sentiment parameter (e.g., a score, a numerical or letter value, etc.) can be generated to represent the intent or sentiment associated with a received communication. For example, in cases where the sentiment parameter indicates that the user is frustrated with the bot, the system can automatically switch the bot with a terminal device operated by a live agent to communicate with the user. In some examples, determining whether to switch between the bot and the terminal device can be performed without a prompt from a user. The determination can be performed automatically at the communication server based any number of factors, including characteristics of the current messages in the communication session, characteristics of previous messages transmitted by the network device in previous communication sessions, characteristics of a real-time sentiment detected from the network device's messages or a trajectory of a changing sentiment as communications are exchanged during the communication session, or additional information associated with the user (e.g., profile information, preference information, and other suitable information associated with the user).

Certain embodiments of the present disclosure include a computer-implemented method. The method may include collecting a data set for training a machine-learning model to predict response messages. Collecting the data set may include storing one or more previous messages included in a previous communication session between a network device and a terminal device associated with an agent. The method may include facilitating a communication session between a terminal device and a network device and receiving a new message during the communication session. The communication session may enable the terminal device and the network device to exchange one or more messages. The method may also include evaluating the new message using the trained machine-learning model. For example, evaluating the new message may include evaluating any messages exchanged before the new message was received. The method may also include predicting a response to the new message. Predicting the response includes using a result of the evaluation to determine which previous message to select from the data set as the predicted response to the new message. The method may also include facilitating displaying the predicted response at the terminal device. When the predicted response is selected, the predicted response may be automatically transmitted to the network device during the communication session.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

Advantageously, the increasingly dynamic nature of data ingested into and processed by systems (e.g., routing systems, the communication server described herein, and other suitable systems) introduces complexity into network environments. Executing bot scripts to autonomously and automatically process tasks involving the complex ingested data can cause undue burden on processing resources in the systems (e.g., incorrect routing of messages may cause servers or queues to be overloaded). Embodiments of the present disclosure provide technical advantages, including the implementation of artificial intelligence or machine-learning techniques, to improve the overall functioning of systems by reducing load imbalance across servers or systems, and continuously enhancing task management by bots.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
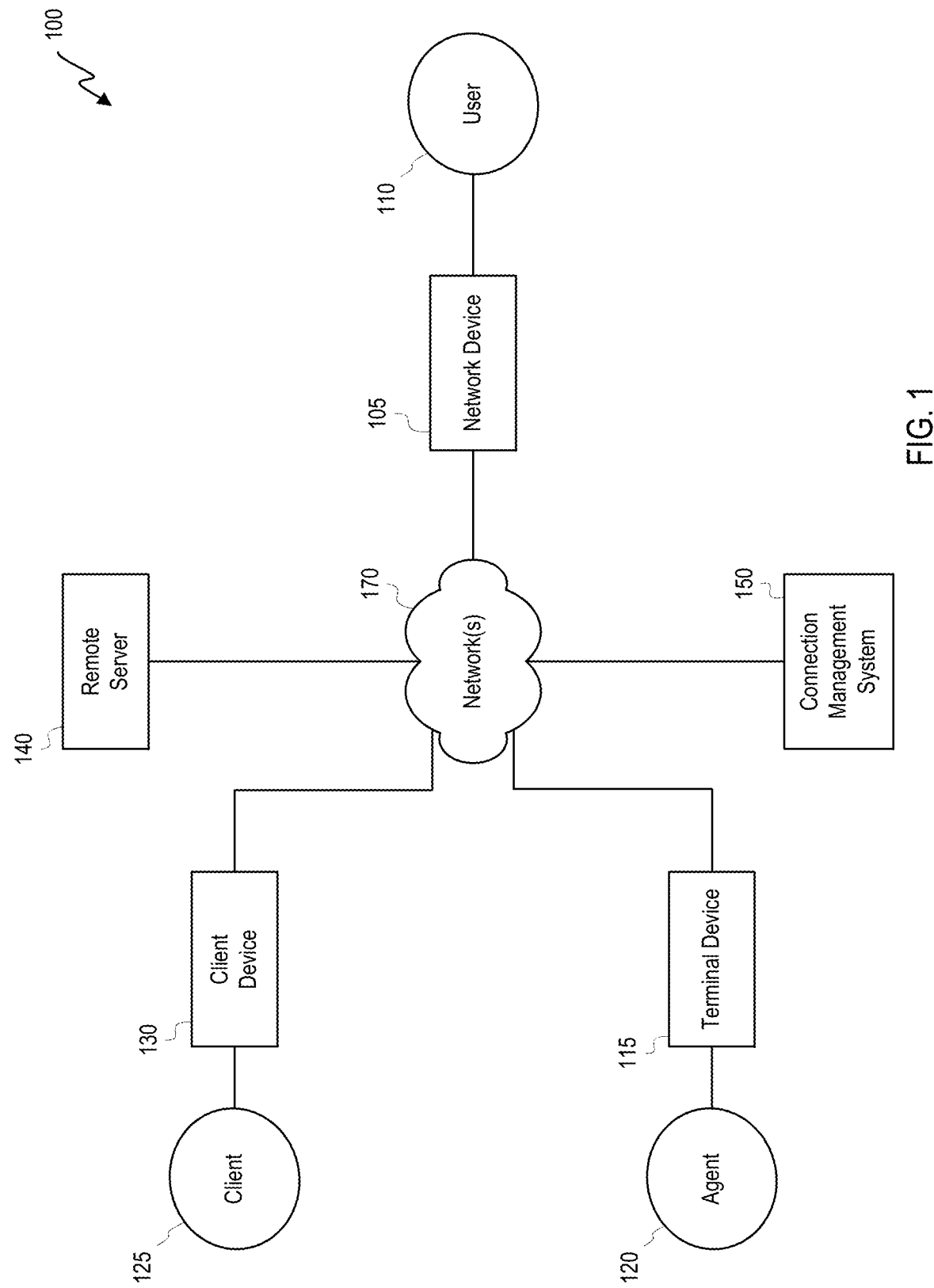
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), extended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
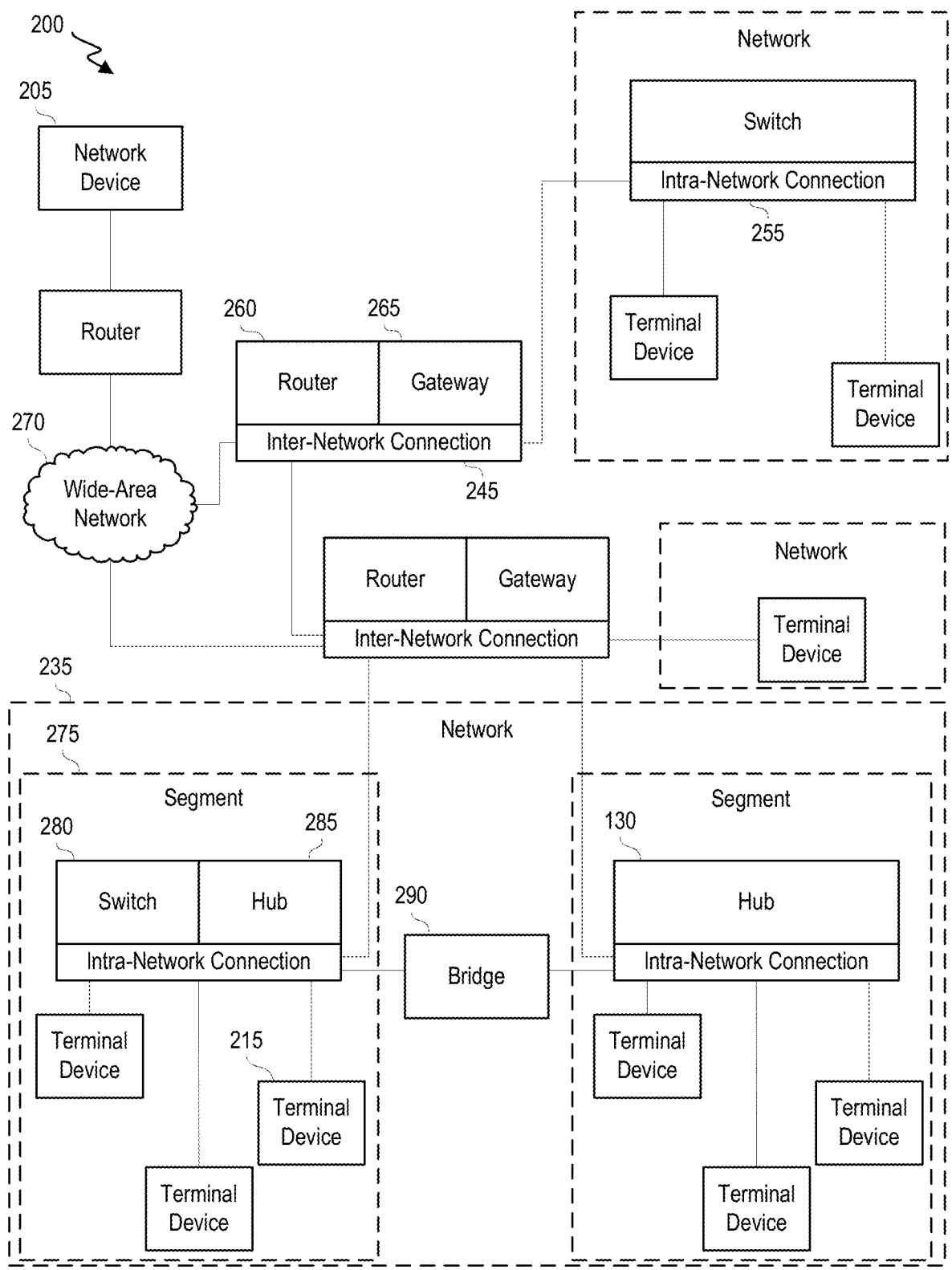
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
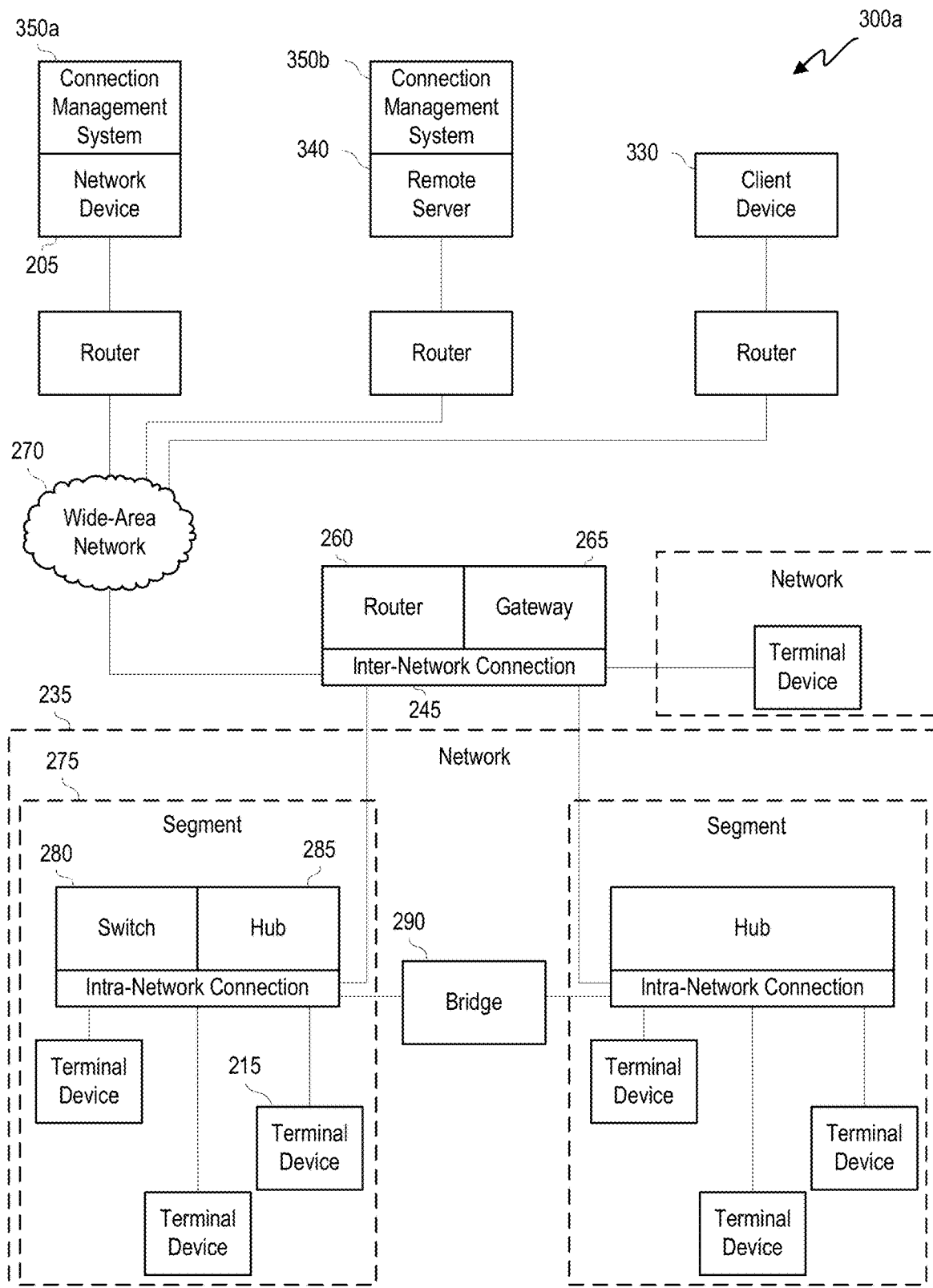
FIGS. 3A-3C show block diagrams of other embodiments of a network interaction system that includes a connection management system.
Figure 3B:
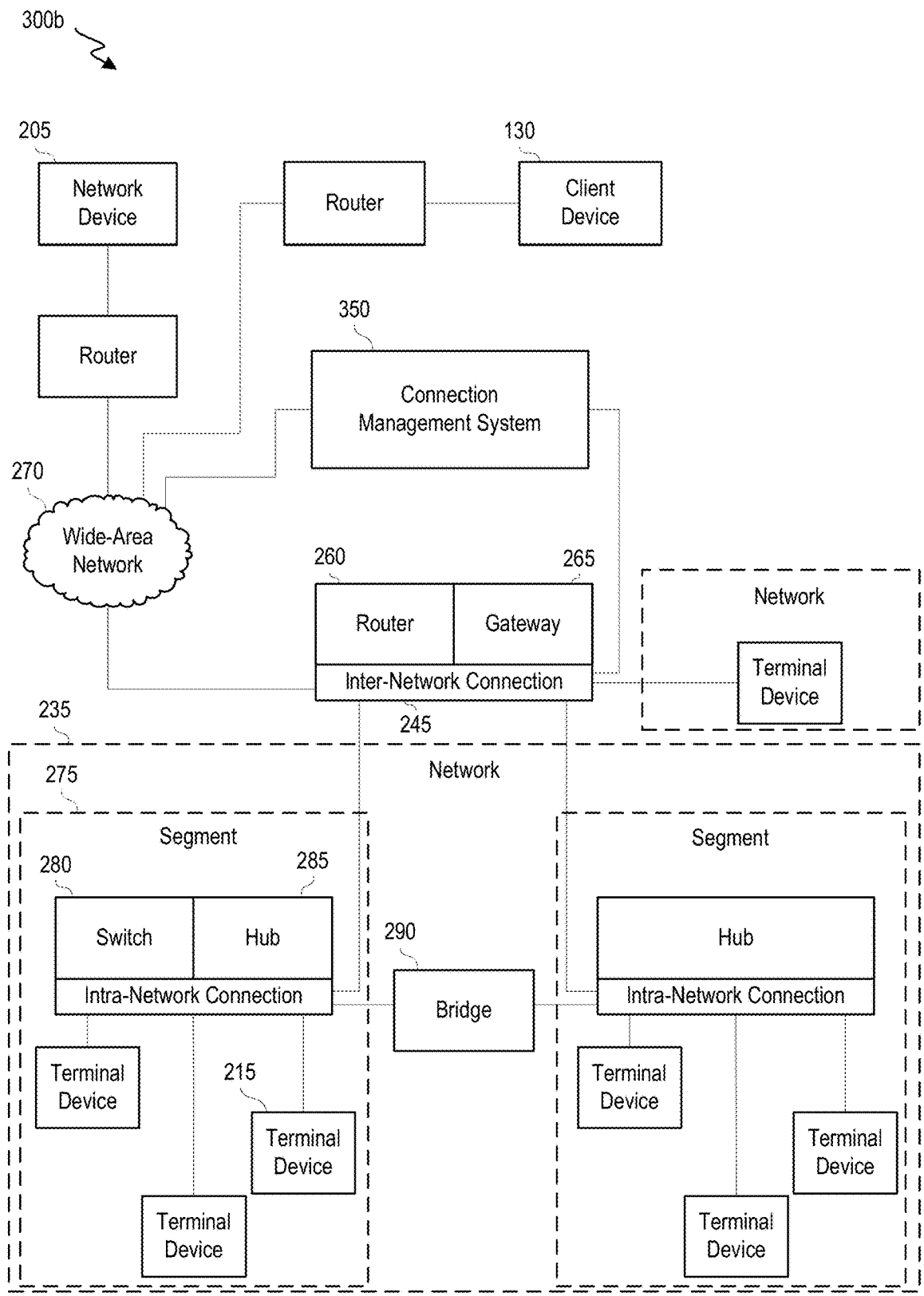
Figure 3C:
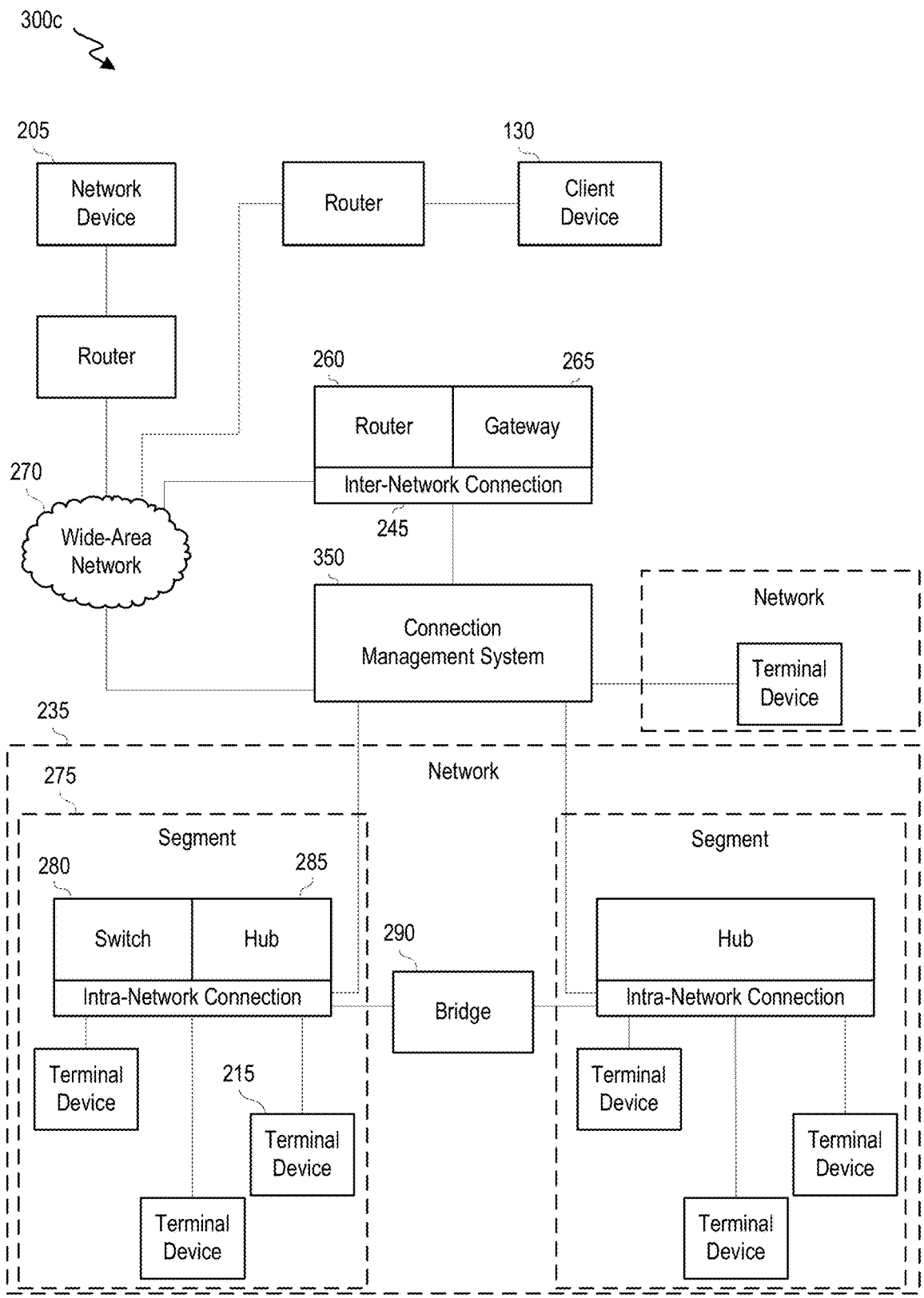

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
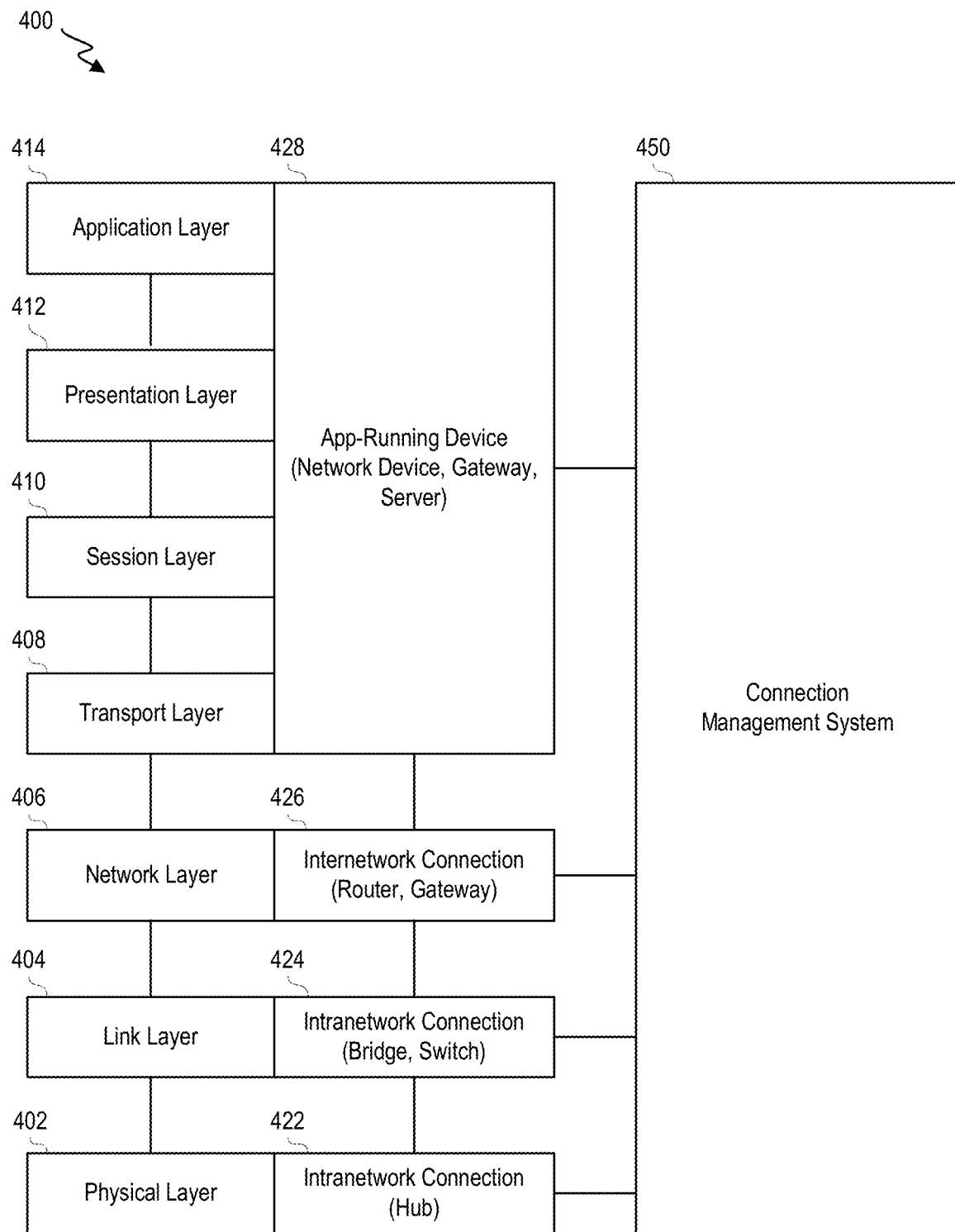
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
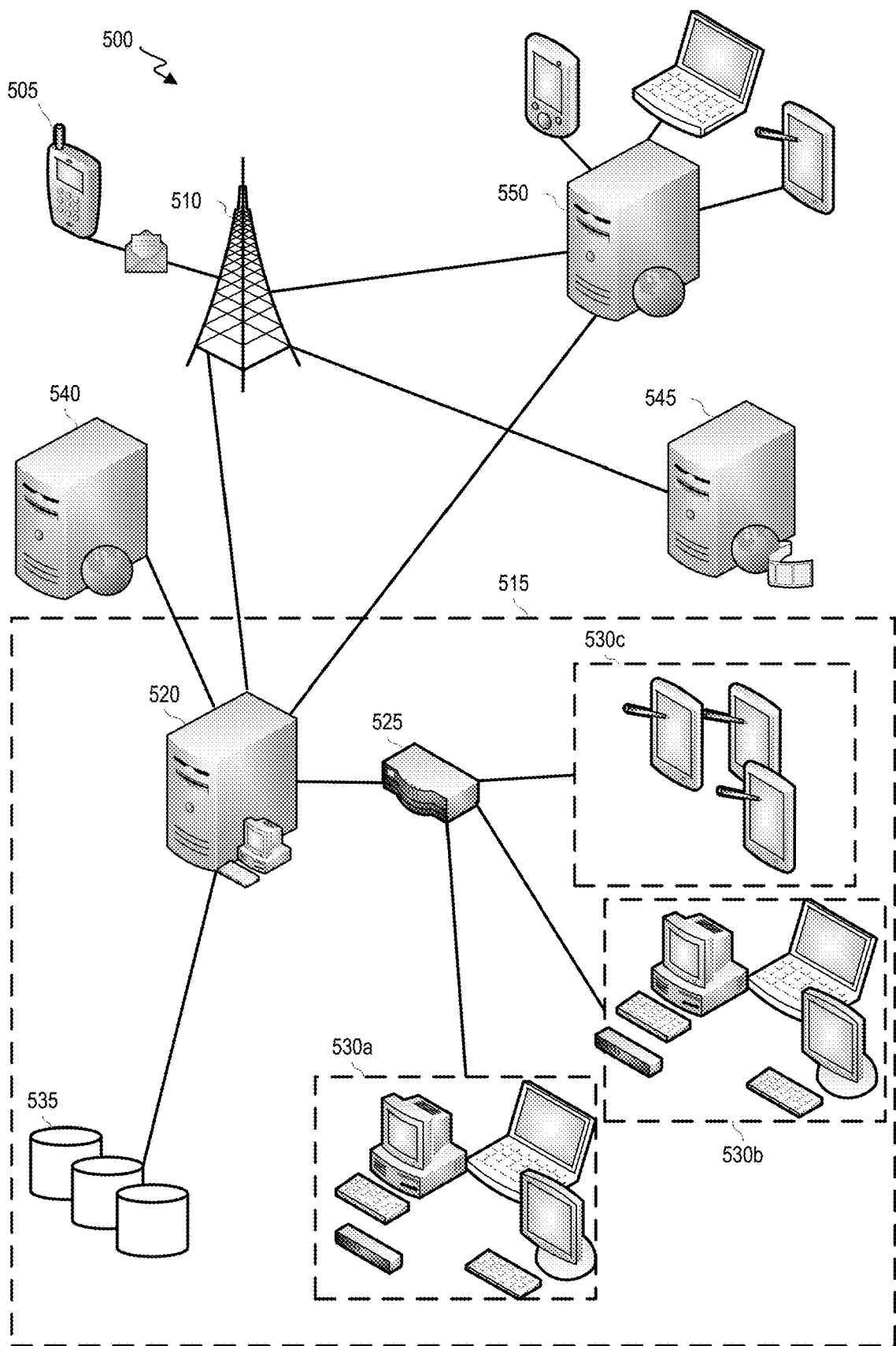
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
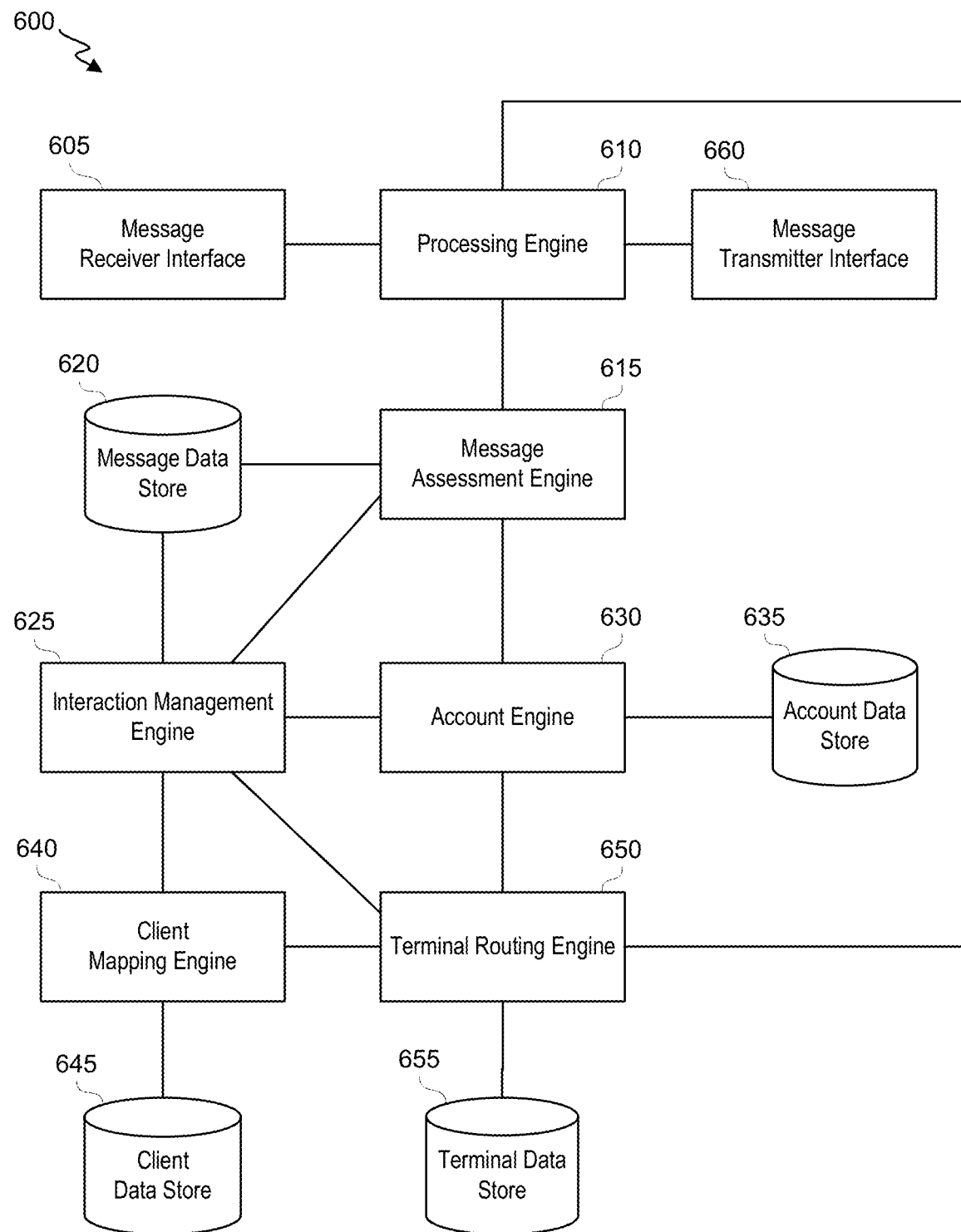
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 625 can (for example) determine whether a terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and methods for dynamically switching between bots and terminal devices (e.g., operated by live agents) during communication sessions with network devices (e.g., operated by users) is provided. In some implementations, bots can be configured to autonomously communicate with network devices. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, and other suitable capabilities. In some implementations, while a bot is communicating with a network device (e.g., operated by the user) during a communication session (e.g., using a chat-enabled interface), a communication server can automatically and dynamically determine to switch the bot with a terminal device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to switch between a bot and a terminal device during a communication session can be based on an analysis of one or more characteristics of the messages in a communication session. Further, a dynamic sentiment parameter can be generated to represent a sentiment of messages, conversations, entities, agents, and so on. For example, in cases where the dynamic sentiment parameter indicates that the user is frustrated with the bot, the system can automatically switch the bot with a terminal device so that a live agent can communicate with the user. See U.S. Ser. No. 15/171,525, filed Jun. 2, 2016, the disclosure of which is incorporated by reference herein in its entirety for all purposes. In some examples, determining whether to switch between the bots and terminal devices can be performed without a prompt from a user. The determination can be performed automatically at the communication server based any number of factors, including characteristics of the current messages in the communication session (e.g., chat), characteristics of previous messages transmitted by the user in previous communication sessions, a trajectory of a characteristic (e.g., a sentiment) over multiple messages in a conversation, or additional information associated with the user (e.g., profile information, preference information, and other suitable information associated with the user).

Figure 7:
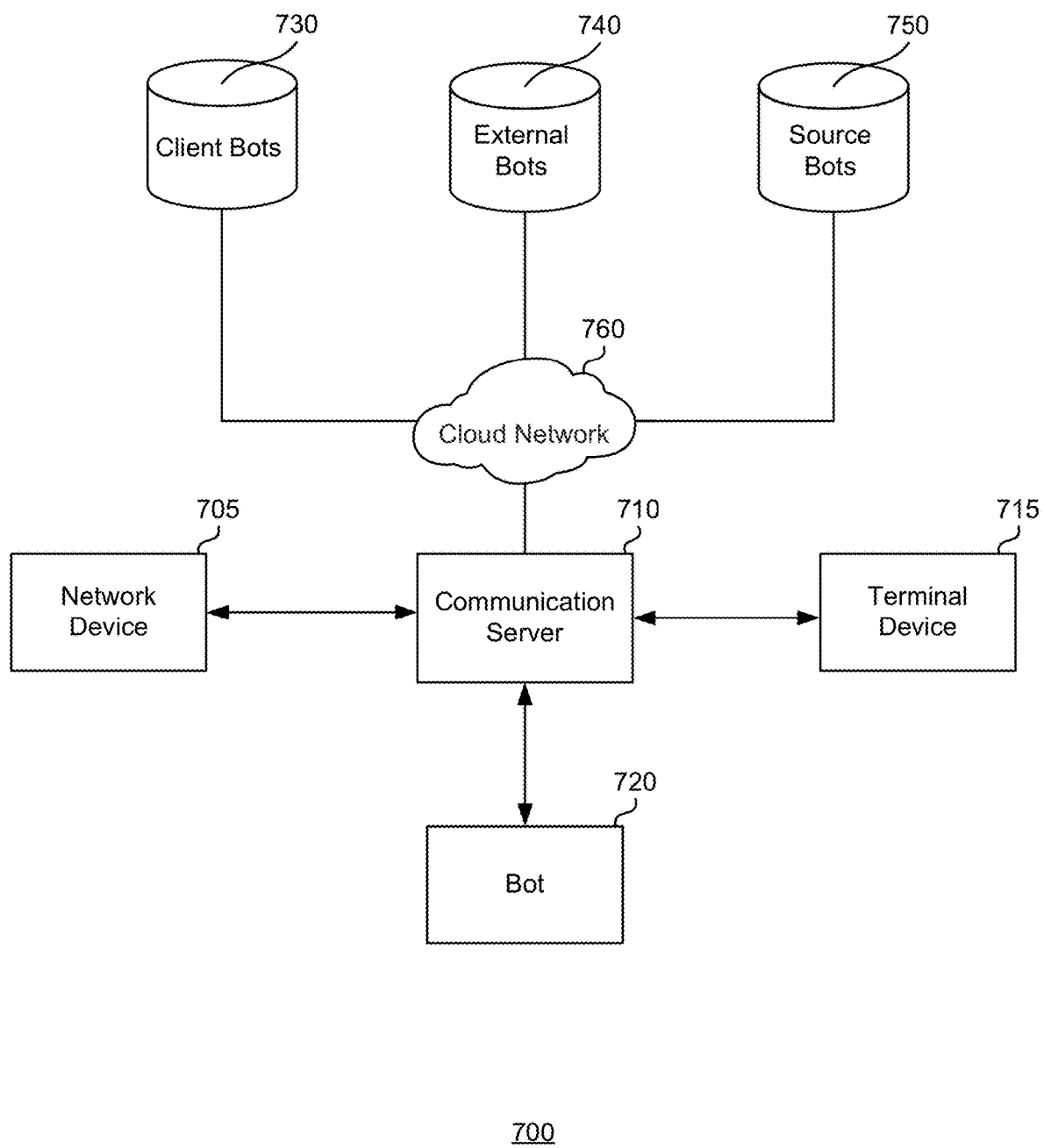
FIG. 7 shows a block diagram of a network environment for dynamically switching between bots and terminal devices during communication sessions.

FIG. 7 shows a block diagram of a network environment for dynamically switching between bots and terminal devices during communication sessions. In some implementations, network environment 700 can include network device 705, communication server 710, terminal device 715, and bot 720. Communication server 710 can be a server with one or more processors with at least one storage device, and can be configured to perform methods and techniques described herein. For example, communication server 710 can manage communication sessions between network devices (e.g., operated by users) and terminal devices (e.g., operated by agents). Communication server 710 can establish a communication channel between network device 705 and terminal device 715 so that network device 705 and terminal device 715 can communicate with each other during a communication session. A communication session can facilitate the exchange of one or more messages between network device 705 and terminal device 715. The present disclosure is not limited to the exchange of messages during a communication session. Other forms of communication can be facilitated by the communication session, for example, video communication (e.g., a video feed) and audio communication (e.g., a Voice-Over-IP connection).

In some implementations, communication server 710 can establish a communication channel between network device 705 and bot 720. Bot 720 can be code that, when executed, is configured to autonomously communicate with network device 705. For example, bot 720 can be a bot that automatically generates messages to initiate conversations with the user associated with network device 705 and/or to automatically respond to messages from network device 705. In addition, communication server 710 can be associated with a platform. Clients (e.g., an external system to the platform) can deploy bots in their internal communication systems using the platform. In some examples, clients can use their own bots in the platform, which enables clients to implement the methods and techniques described herein into their internal communication systems.

In some implementations, bots can be defined by one or more sources. For example, data store 730 can store code representing bots that are defined (e.g., created or coded) by clients of the communication server. For example, a client that has defined its own bots can load the bots to the communication server 710. The bots defined by clients can be stored in client bots data store 730. Data store 740 can store code representing bots that are defined by third-party systems. For example, a third-party system can include an independent software vendor. Data store 750 can store code representing bots that are defined by an entity associated with communication server 710. For example, bots that are coded by the entity can be loaded to or accessible by communication server 710, so that the bots can be executed and autonomously communicate with users. In some implementations, communication server 710 can access bots stored in data store 730, data store 740, and/or data store 750 using cloud network 760. Cloud network 760 may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In addition, terminal device 715 can be operated by an agent. Terminal device 715 can be any portable (e.g., mobile phone, tablet, laptop) or non-portable device (e.g., electronic kiosk, desktop computer, etc.). In some instances, the agent can access a website using a browser that is running on terminal device 715. For example, the website can include a console or platform that is running on the browser of terminal device 715. The agent can be logged into the platform using the browser. One or more login credentials (e.g., username, password, and the like) can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent to communicate with a user, and to view communications between the user and one or more bots.

In some implementations, communication server 710 can be configured to dynamically switch between bot 720 and terminal device 715 during a particular communication session. For example, communication server 710 can facilitate a communication session between network device 705 and bot 720. Bot 720 can be configured to autonomously communicate with network device 705 by exchanging one or more messages with the network device 705 during the communication session. Communication server 710 can dynamically determine whether to switch bot 720 with terminal device 715 (or in some cases, vice versa) so that a live agent can communicate with network device 705, instead of bot 720. In some implementations, the switching can be performed without a prompt from the network device 705 or terminal device 715. For example, the switching can be based on message parameters (e.g., scores representing sentiment of a message or series of messages) of the messages exchanged between the network device 705 and the bot 720, without prompting the network device 705 to request a terminal device.

In some implementations, communication server 710 can determine to switch between bot 720 and terminal device 715 automatically based on characteristics of the messages exchanged between the bot 720 and the network device 705. In some instances, analyzing the text of a message to determine the characteristic (e.g., the message parameter) can include an analysis of textual or non-textual attributes associated with the message. For example, communication server 710 can extract one or more lines of text included in the message from network device 705. Communication server 710 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to switch between the bots and the terminal device can be based on the message parameter, which is continuously and automatically updated with each new message received at communication server 710.

In some implementations, communication server 710 may recommend or predict responses to messages received from network device 705. For example, communication server 710 can include a message recommendation system (described in FIG. 10), which can evaluate messages received from network device 705 and use a machine-learning model to recommend responses to those received messages. The message recommendation system can display a set of recommended messages on terminal device 715 to assist the agent in communicating with network device 705.

Figure 8:
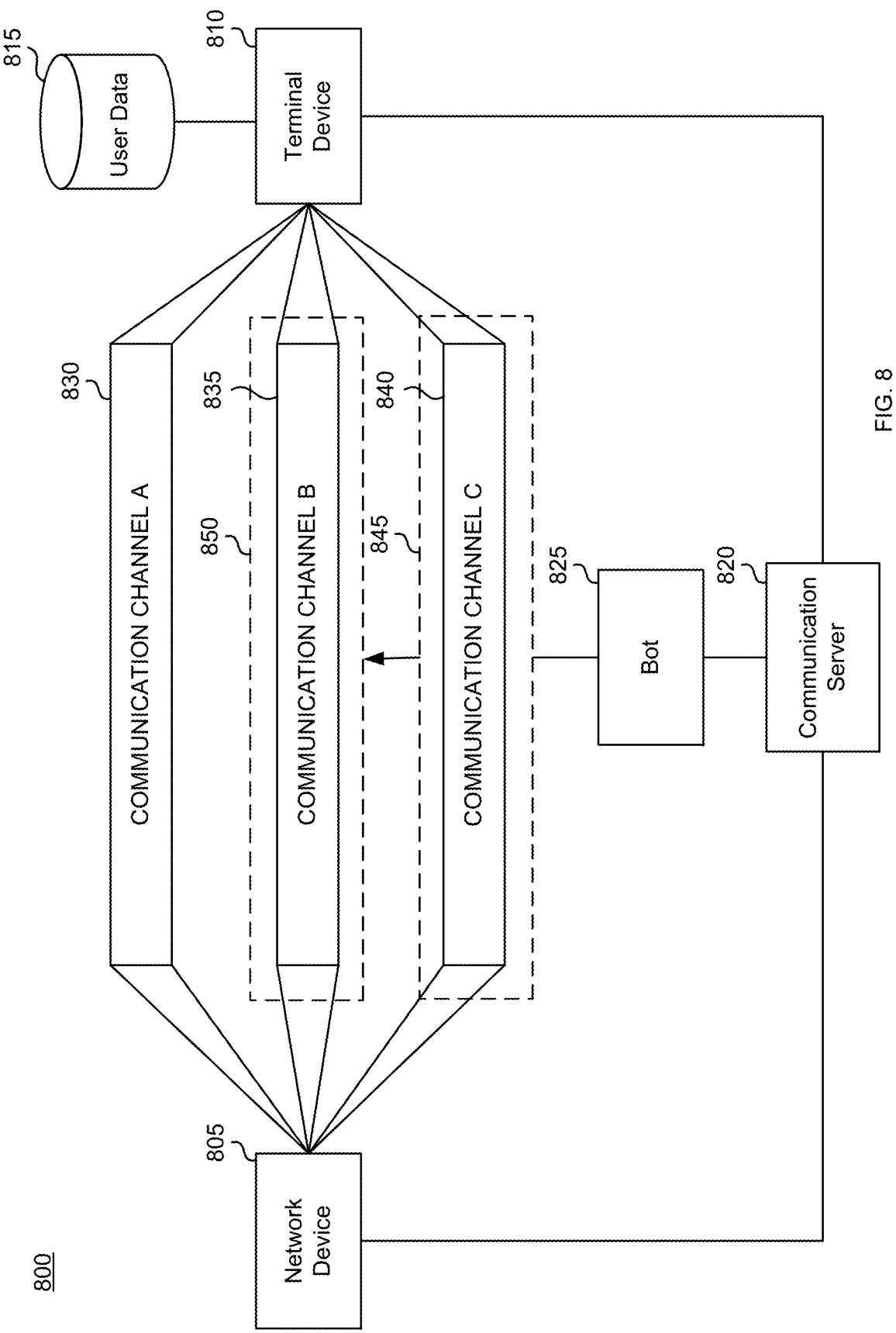
FIG. 8 shows a block diagram representing a network environment for dynamically providing bot task processing across multiple channel environments.

FIG. 8 shows a block diagram representing network environment 800 for dynamically providing bot task processing across multiple communication channels. In some implementations, network environment 800 may include network device 805, terminal device 810, and communication server 820. Network device 805 may be similar to network device 705, and thus, a description is omitted here for the sake of brevity. Terminal device 810 may be similar to terminal device 715, and thus, a description is omitted here for the sake of brevity. Communication server 820 may be similar to Communication server 710, and thus, a description is omitted here for the sake of brevity.

Communication server 820 may establish or facilitate the establishment of a communication channel between network device 805 and terminal device 810. As illustrated in FIG. 8, communication server 820 may establish communication channel C 840, which enables network device 805 and terminal device 810 to exchange one or more messages. As a non-limiting example, communication channel C 840 may be a web chat feature of a website, communication channel B 835 may be a chat application running on a mobile device (e.g., a smart phone), and communication channel A 830 may be a voice over Internet Protocol (VOIP) audio channel that enables the agent to communicate with the user.

Communication server 820 may configure bot 825 to autonomously communicate with network device 805. In some implementations, bot 825 may access and execute one or more protocols that enable bot 825 to communicate with network device 805 using communication channel C 840. Continuing with the non-limiting example above, bot 825 may access and execute a protocol for communicating over the web chat feature of the website. In this example, the protocol may include a coding language specific to the web chat feature for exchanging messages using the web chat feature. The protocol may include code that, when executed, converts a message (e.g., a string of text or other content) inputted by an agent at terminal device 810 into structured content (e.g., content separated into independent data fields), and maps the structured content to elements of the web chat feature of the website. As input is received at terminal device 810 (e.g., by the agent), bot 825 can translate the structured content to the elements of the web chat feature to enable the message to be communicated using the web chat feature.

In some implementations, bot 825 can also be configured to communicate with network device 805 using communication channel B 835. Communication channel B 835 can be a different communication channel from communication channel C 840. Further, communication channel B 835 may require different elements to facilitate communication than the elements required for communication channel C 840. Bot 825 can be configured to translate the structured content to the elements of communication channel B 835. Continuing with the non-limiting example described above, communication channel B 835 may be an in-app chat feature of a native application running on a smart phone. One or more elements may be required in order to facilitate communication using communication channel B 835. For example, FACEBOOK MESSENGER may be the native application running on the smart phone. In this example, the one or more elements of FACEBOOK MESSENGER may be templates specific to FACEBOOK MESSENGER that are required to facilitate communication using FACEBOOK MESSENGER. The protocol that enables bot 825 to communicate using communication channel B 835 may map the structured content to the templates of the FACEBOOK MESSENGER native application in order to transmit the structured content as a message within the FACEBOOK MESSENGER application.

In some examples, a mobile application (e.g., a mobile native application) may include executable code (stored in the mobile device or at one or more external servers) that can be executed using the operating system of the network device (e.g., a smartphone). In some examples, the mobile application may include a hybrid mobile application that is comprised of native user interface (UI) components (generated and stored at the mobile device), but is written in an interpreted language (e.g., using Web-based coding languages). The present disclosure is not limited to mobile native applications or hybrid applications, and thus, any type of mobile application may be used in the methods described herein.

In some implementations, bot 825 can also be configured to communicate with network device 805 using communication channel A 830. Communication channel A 835 can be a different communication channel from communication channel C 840 and communication channel B 835. Further, communication channel A 830 may require different elements to facilitate communication than the elements required for communication channel C 840 and for communication channel B 835. Bot 825 can be configured to translate the structured content to the elements of communication channel A 830. Continuing with the non-limiting example described above, communication channel A 830 may be a VOIP audio communication link between network device 805 and terminal device 810. One or more elements may be required in order to facilitate communication using communication channel A 830. The protocol may include a mapping of the structured content to the elements associated with communication channel A 830.

In some implementations, communication server 820 may be configured to dynamically, autonomously, and/or automatically transfer a communication session between different communication channels, so that bot 825 can continuously communicate with network device 805, regardless of the communication channel. For example, network device 805 may be communicating with terminal device 810 using a first communication channel 845 (i.e., communication channel C 840). Network device 805 may transmit a message indicating that the user operating network device 805 intends to change the communication channel currently being used for the communication session. For example, network device 805 may indicate that second communication channel 850 is the target communication channel for continuing the communication session with terminal device 810. Bot 825 can automatically detect the indication that the communication channel should be changed from first communication channel 845 to second communication channel 850. For example, bot 825 may continuously evaluate messages exchanged during the communication session to detect that the communication channel should be changed. Upon detecting the indication that the communication channel should be changed, communication server may identify the user identifier associated with network device 805. For example, user data database 815 may store user identifiers for various users. A user identifier may be a string of text and/or numbers that uniquely identifies a network device. If, at any given time, communication server 820 determines that the same user identifier is associated with two active communication channels, communication server 820 can recognize that the network device is requesting to continue a communication session but to change the communication channels.

Communication server 820 may be configured to support continuity between different communication channels. For example, the target communication channel (e.g., second communication channel 850) can be automatically used by bot 825 to continue the communication session with network device 805, but using second communication channel 850, instead of first communication channel 845. In some implementations, bot 825 may automatically transmit a message to network device 805 using second communication channel 850. Transmitting the message to network device 805 may indicate to network device 805 that the transfer of communication channels is complete. In some implementations, communication server 820 may automatically detect that the communication channel has been changed from first communication channel 845 to second communication channel 850. For example, communication server 820 may recognize the user identifier associated with network device 805 when network device 805 is communicating with bot 825 using first communication channel 845. If network device 805 begins using second communication channel 850 (e.g., without indicating the intention to change communication channels during the communication session), communication server 820 can automatically detect that the user identifier for network device 805 is currently associated with two active communication channels (e.g., first communication channel 845 and second communication channel 850). Communication server 820 can detect that first communication channel 845 is associated with a recent history of messages (e.g., messages transmitted or exchanged within the last five minutes) and that second communication channel 850 is not associated with a recent history of messages (e.g., within the last few minutes). As a result, communication server 820 can determine that network device 805 is requesting to transfer the communication session from first communication channel 845 to second communication channel 850. Communication server 820 can implement the transfer by accessing the protocol associated with second communication channel 850, and executing bot 825 using the accessed protocol to enable bot 825 or terminal device 810 to communicate with network device 805 using second communication channel 850, instead of using first communication channel 845.

In some implementations, one or more machine-learning techniques can be used to identify patterns in the communication channel usage of network device 805. For example, the usage of communication channels by network device 805 can be tracked and recorded (and stored as historical data). Machine-learning techniques can be applied to the historical data to identify which communication channel network device 805 is most likely to use when communicating with a particular entity (e.g., company, terminal device, agent, and so on). When initiating communications from terminal device 810 (or bot 825 or any other terminal device) to network device 805, communication server 820 can establish a communication channel of the type that network device 805 is most likely to use (based on the results of the machine learning techniques). As network device 805 begins to use a different communication channel more frequently, communication server 820 can identify this changing trend and initiate communication sessions using the most used or most frequently used communication channel.

Figure 9:
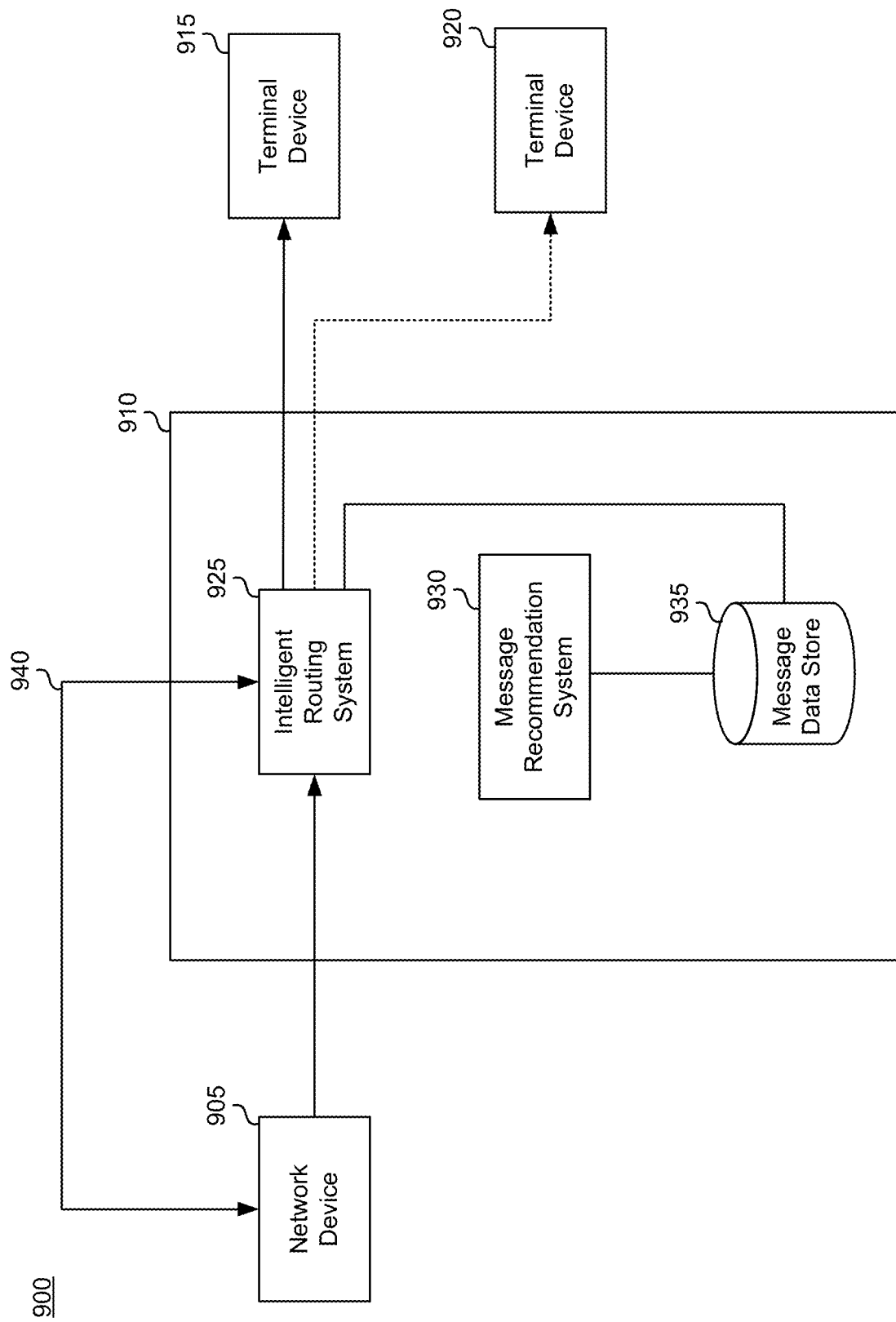
FIG. 9 shows a block diagram representing a network environment for enhancing bot task processing using machine-learning techniques.

FIG. 9 shows a block diagram representing network environment 900 for enhancing bot task processing using machine-learning techniques. Network environment 900 may include network device 905 (operated by a user) communication server 910 and terminal devices 915 and 920. Communication server 910 can facilitate the establishment of a communication channel that enables network device 905 and at least one of terminal devices 915 and 920 to communication.

Communication server 910 may include intelligent routing system 925, message recommendation system 930, and message data store 935. Each of intelligent routing system 925 and message recommendation system 930 may include one or more computing devices with a processor and a memory that execute instructions to implement certain operations. In some implementations, intelligent routing system 925 may be a bot configured to intelligently route communications received from network devices to the appropriate destination. Intelligent routing system 925 may include one or more processors configured to execute code that causes one or more machine-learning techniques or artificial intelligence techniques to intelligently route messages. In some implementations, intelligent routing system 925 can execute one or more machine-learning techniques to train a model that predicts a destination associated with a message received from network device 905.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above. For example, intelligent routing system 925 may evaluate the content (e.g., text, audio clips, images, emoticons, or other suitable content) included in the received message using a trained machine-learning model. The content of the message can be inputted into the machine-learning model to generate a predicted destination (e.g., a particular terminal device). The machine-learning model may be continuously trained based on feedback signal 940 received from network device 905. In some implementations, intelligent routing system 925 may request an acknowledgement from network device 905 of the predicted destination. As a non-limiting example, intelligent routing system 925 may evaluate the message using a machine-learning technique, and a result of the evaluation may include a predication that terminal device 915 is the destination for the message. To confirm, intelligent routing system 925 may automatically request feedback signal 940. For example, feedback signal 940 may include a request for network device 905 to acknowledge whether terminal device 915 is the correct destination for the message (e.g., "Is Technical Support the correct destination?"). If network device 905 transmits the acknowledgement that terminal device 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to terminal device 915. However, if intelligent routing system 925 receives feedback signal 940 indicating that terminal device 915 is not the correct or intended destination for the received message, but rather terminal device 920 was the correct or intended destination, intelligent routing system 925 can train the machine-learning model that future messages including the exact or similar content as the received message are to be routed to terminal device 920 (instead of terminal device 915). In some implementations, intelligent routing system 925 may not immediately update or train the machine-learning model to route future messages to terminal device 920, but rather, intelligent routing system 925 may wait for a threshold number of incorrect routings to terminal device 915 before routing all future messages with the exact same or similar content as the received message to terminal device 920. As a non-limiting example, intelligent routing system 925 may begin routing future messages (that were predicted to be routed to terminal device 915) to terminal device 920 instead of terminal device 915 after five instances of network devices transmitting feedback signals indicating that terminal device 915 is not the correct or intended destination.

Message data store 935 may store some (e.g., but not all) or all messages received in the past from one or more network devices. Further, message data store 935 may also store some or all messages transmitted by terminal devices during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more responses messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

Figure 10:
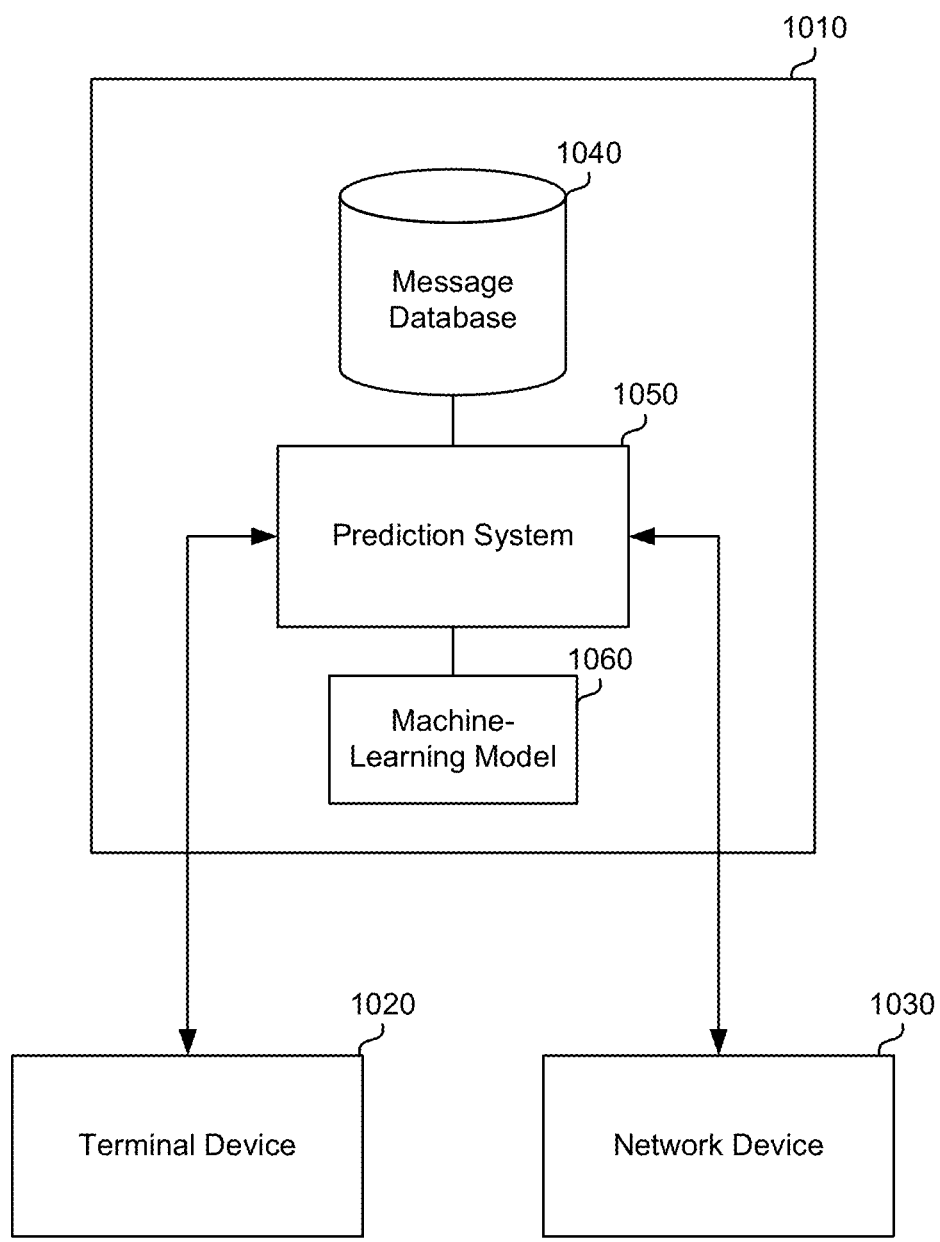
FIG. 10 shows a block diagram representing a network environment for predicting responses in real-time during communication sessions.

FIG. 10 shows a block diagram representing network environment 1000 for predicting responses in real-time during communication sessions. In some implementations, network environment 1000 can include communication server 1010, the prediction system 1050, the message database 1040, and the machine-learning model 1060. Network device 1030 can be operated by a user (e.g., a website visitor, a mobile website visitor, or a native application user) who can communicate with terminal device 1020 operated by an agent. The prediction system 1050 can predict messages to be presented on the display of terminal device 1020, and the agent operating the terminal device can select a displayed predicted message. Upon selecting the displayed predicted message, that predicted message is automatically included in the chat session as the next message and transmitted to network device 1030.

For the purpose of illustration and as a non-limiting example, communication server 1010 may facilitate establishing a communication channel between network device 1030 and terminal device 1020. The communication channel may be configured to enable network device 1030 to communicate with terminal device 1020 (e.g., by exchanging messages, audio, video, or other suitable data) during a communication session (e.g., a period of time in which the user and the agent are engaged in conversation or are not engaged in conversation, a synchronous communication session, an asynchronous communication session). Network device 1030 may transmit a message during the communication session. The message may include the following text: "Could you please help me with a technical issue I'm experiencing with the new ABC smart phone?" As the message or text strings of the message are received at communication server 1010 in real-time, prediction system 1050 may automatically evaluate the message or the portion of the message (e.g., portion of text of the message) received in real-time. Substantially at the same time (e.g., concurrently or within seconds of receiving the message or portion of the message), the prediction system 1050 may access machine-learning model 1060 to predict a response to the received message. For example, prediction system 1050 may access machine-learning model 1060 to identify a cluster of previous messages that are similar to the received message. For example, prediction system 1050 may associate clusters of previous messages with a tag. As a non-limiting example, one of the clusters of messages may be tagged as a "technical issues with ABC smart phone" cluster of messages. Some or all of the messages in the "technical issues" cluster may be associated with previous conversations between network devices and terminal devices or bots about technical issues with items, such as the ABC smart phone. For example, prediction system 1050 may perform a confidence analysis on the "technical issues" cluster to identify the top 10 previous responses to the same or similar question included in the received message. A confidence analysis may include executing a confidence algorithm that determines the similarity between the received message and the previous agent responses included in the identified cluster. As long as the confidence threshold is above a threshold value (e.g., above 60%), the prediction system 1050 may cause terminal device 1020 to display the top several (e.g., 5, 10, or any other number) previous agent responses with the highest confidence percentages. Once a previous agent response is selected at terminal device 1020, the previous agent response may be automatically transmitted to network device 1030 as part of the current communication session. In some implementations, once a previous agent response is selected at terminal device 1020, once a previous agent response is selected, the selected response may be displayed at the terminal device 1020, and the selected response may be revised by the agent before being transmitted to network device 1030.

In some implementations, as messages are received at communication server 1010 (the messages being part of existing communication sessions), the prediction system 1050 may automatically display additional data on terminal device 1020. For example, as the message is being entered at network device 1030, communication server 1010 (and thus, terminal device 1020) is receiving the text string of the message in real-time. Prediction system 1050 may be continuously evaluating the received messages or the received portion of the message to determine queries for databases to retrieve the additional data. Continuing with the non-limiting example above, as communication server 1010 receives the message (or portions of the message in real-time) "Could you please help me with a technical issue I'm experiencing with the new ABC smart phone," prediction system 1050 can continuously determine whether any additional data can be queried to support the agent in responding to the message. In this example, even though network device 1030 is communicating with terminal device 1020 during the communication session, prediction system 1050 may query one or more databases (not shown) for additional data (e.g., technical specification, troubleshooting guides, and the like) associated with the ABC smart phone as the message is being typed at network device 1030 and/or received at communication server 1010, so that dynamically-changing additional data is displayed at the terminal device 1020 as the message is being typed at network device 1030. In some implementations, this querying occurs in real-time as the network device is communicating with the terminal device, however, the present disclosure is not limited thereto. The results of the querying are displayed at the terminal device in an effort to reduce the agent's need to perform the query himself or herself.

It will be appreciated that communication server 1010 can automatically perform a workflow based on the additional data retrieved after the query. As a non-limiting example, during a communication session, network device 1030 may transmit a message indicating an issue. When the message is received at communication server 1010, prediction system 1050 can (in real-time) query one or more databases for data associated with the issue. Further, prediction system 1050 can execute one or more workflows to automatically analyze the retrieved data. For example, prediction system 1050 can perform a standard deviation analysis on the retrieved data to determine the standard deviation of values included in the data. Prediction system 1050 can automatically perform the one or more workflows and display the retrieved data and/or the results of analyzing the retrieved data at terminal device 1020 so that the live agent does not have to perform those queries and that analysis himself or herself. In some implementations, the workflows may be user defined or may be automatically generated based on artificial intelligence or machine learning techniques. Further, workflows may be associated with specific content in messages, for example, specific terms in a message. If a message includes a particular term or phrase, prediction system 1050 can access the workflow(s) associated with that particular term or phrase. The workflows can also be optimized or automatically modified based on the results of a machine-learning analysis on historical messages from other network devices. For example, prediction system 1050 can access message database 1040 (which is similar to message data store 935) to evaluate other communications from other users. Prediction system 1050 can determine that other agents performed certain workflows on data provided by the user or access on behalf of the user for a particular issue. Prediction system 1050 can then learn those workflows and perform those workflows for users when future communications are determined to be associated with the particular issue. In some implementations, a predicted message may not be exactly the same as or similar to a previous agent response included in a tagged cluster of messages, but rather, a predicated message can be constructed by querying several systems and building the predicted message. For example, to generate a predicted response to the issue with ABC smart phone, prediction system 1050 can query a first database for technical documents corresponding to ABC smart phone and a second database for video content data associated with ABC smart phone. The predicted response can be constructed by including text, along with the queried technical documents and the queried video content data.

Machine-learning model 1060 may be a model that is generated using an artificial intelligence or machine learning technique. For example, machine-learning model 1060 may be a model that is generated using supervised, semi-supervised, or unsupervised machine-learning techniques. As a non-limiting example, one or more clustering algorithms can be used, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, machine-learning model 1060 may use support vector machines (SVM), supervised, semi-supervised, or unsupervised machine-learning techniques to evaluate all previous messages to predict responses to incoming messages received from network devices during communication sessions.

Figure 11:
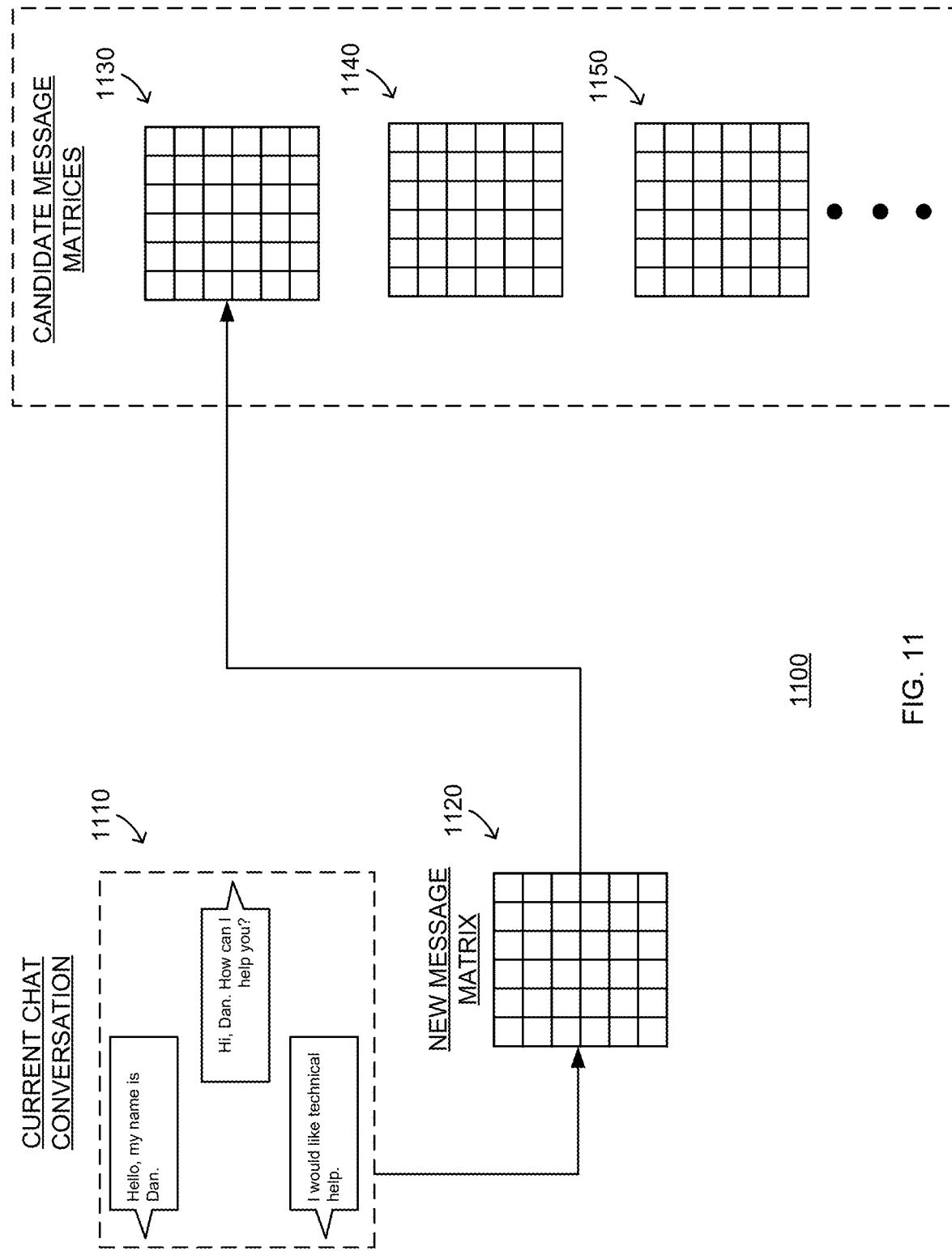
FIG. 11 shows an example process for predicting responses in real-time during communication sessions.

FIG. 11 shows an example process 1100 for predicting agent responses. Each candidate message stored in message data store 935, for example, can correspond to a matrix that includes vector parameters associated with the message and/or associated with the communication session in which the message was transmitted. Examples of a vector parameter may include the number of words in the message, the number of messages exchanged in the communication session, the anchors used in the messages, the message parameters of the messages, and other suitable parameters. Each of these vector parameters can be stored in the matrix as a vector representation of that message and/or communication session. Matrices can be continuously updated as a communication session between a network device and a terminal device continues and new messages are exchanged.

As a non-limiting example, a current chat conversation 1110 including one or more messages exchanged between the user and the agent can also be transformed into a new message matrix 1120. Similarly, the new message matrix 1120 can include the number of words in the current chat conversation 1110, the words themselves, and the number of vector parameters associated with the messages in the current chat conversation 1110. In some implementations, the new message matrix 1120 can continuously be updated as new messages are entered into the chat conversation 1110. For example, each new message can be included in the new message matrix 1120. Candidate message matrices 1130, 1140, and 1150 can be generated and stored for each message (e.g., candidate message) stored in message data store 935.

Advantageously, the new message matrix 1120 can be dynamically updated as the conversation between the user and the agent continues. The new message matrix 1120 can be compared against each candidate message matrix (e.g., matrices 1130, 1140, and 1150). For example, the absolute value of the matrices can be compared and a similarity score can be generated. The most similar candidate message matrix can be selected, and the candidate message corresponding to the selected candidate message matrix can be used as the predicted message that is displayed at the agent's terminal device. For example, the matrix may include data about the message, including the number of characters in the message, the number of words in the message, the number of non-word characters in the message, such as exclamation points and question marks, and other suitable data. A value can be generated for each vector parameter of the matrices. In some implementations, the value can represent a severity or intensity of the vector parameter. For example, a value of 85 can represent a positive anchor included in the message, whereas, a value of −14 can represent a negative anchor included in the message.

Figure 12:
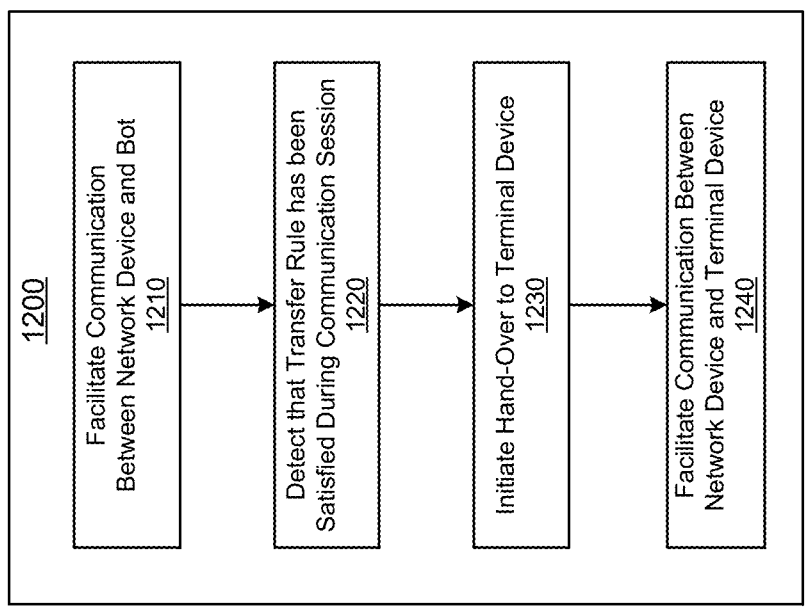
FIG. 12 shows an example process for switching between a bot and a terminal device during a communication session.

FIG. 12 shows an example process 1200 for switching between a bot and a terminal device during a communication session with a network device. At block 1210, the bot can communicate with the network device associated with the user by exchanging one or more messages using an interface. In some implementations, the bot can be selected from a plurality of bots. For example, each bot can be configured to perform a specific capability (e.g., assist with updating database records). A bot can be selected from the plurality of bots based on the intent of the user (who may have initiated the communication session). The intent of the user can be determined by analyzing one or more messages transmitted by the user to the communication server.

At block 1220, the communication server (which relays messages back and forth between the network device and the bot) can detect that a transfer rule has been satisfied during the chat session. For example, a transfer rule can be a threshold that determines when a chat session should be handed over to a live agent. For example, message parameter of the conversation between the bot and the user can be continuously monitored and compared against the threshold. When the message parameter satisfies the threshold (e.g., equal to or less than, equal to or greater than, equal to, less than, greater than, and so on), the communication server can determine that the transfer rule has been satisfied. In some implementations, determining whether the transfer rule is satisfied can be determined without a prompt from the user (e.g., without the user needing to indicate that the user would like to communicate with a live agent). In some implementations, the determining whether the transfer rule is satisfied can be determined based on user input that satisfies a condition. For example, if the user indicates that he or she would like more information about a new item (and uses the item name in a message of the chat session), the item name can be detected, which satisfies the condition that satisfies the transfer rule.

At block 1230, the communication server can initiate a hand over (e.g., switch between the bot and the terminal device) of the chat session from the bot to a terminal device operated by a live agent. In some implementations, initiating the hand over can include evaluating which terminal device to select to communicate with the network device. Terminal devices can be grouped by specialty of the agent. In some examples, the topic of the communication session between the bot and the user can be used to select the terminal device. In other examples, the terminal device that is associated with (e.g., responsible for managing) the bot can be selected or notified of the hand over, and then the terminal device can seamlessly communicate with the user. In some examples, when the chat session is handed over to the terminal device, the chat information, user information, and any other additional information can be presented on the terminal device so that the agent can easily assist the user. At block 1240, the communication server can facilitate the chat session between the user and the terminal device associated with the agent.

Figure 13:
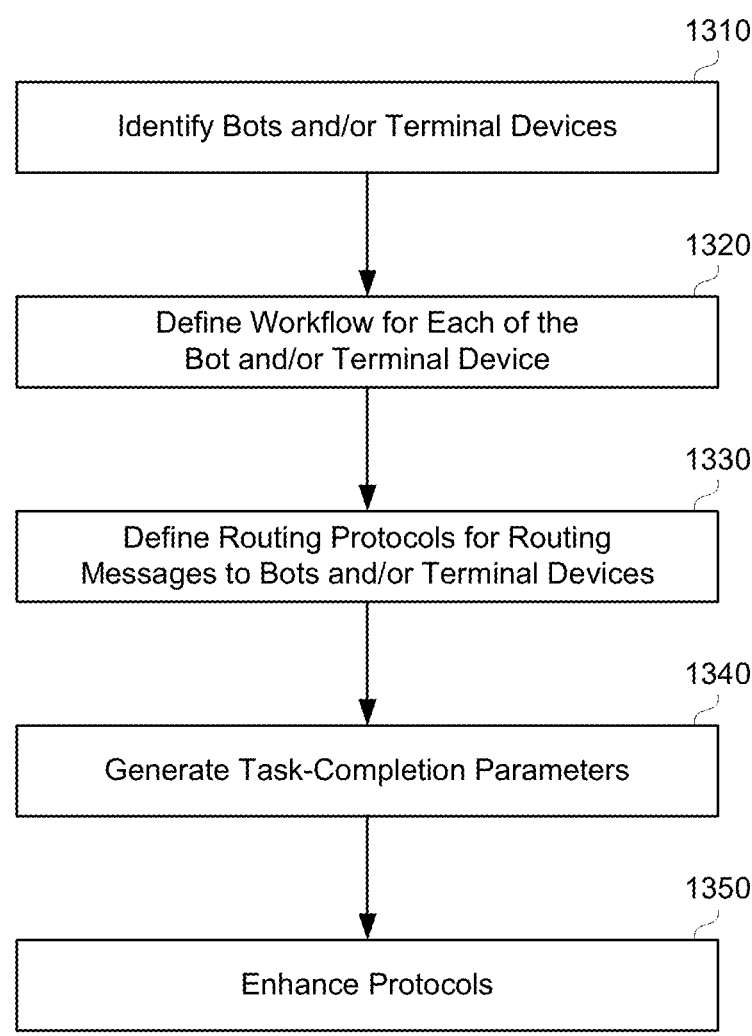
FIG. 13 shows an example process flow performed, at least in part, by the communication server for executing end-to-end management of bots.

FIG. 13 shows an example process flow performed, at least in part, by the communication server for executing end-to-end management of bots. Process flow 1300 can be performed, at least in part, by the communication server (e.g., communication server 1010). Process flow 1300 can begin at block 1310 where bots and/or terminal devices are identified for loading into the communication server. For example, bots can be treated the same as terminal devices by the communication server.

At block 1320, workflows can be defined for each of the bots and terminal devices identified in block 1310. For example, each bot can be assigned or configured to perform a specific capability. The workflow or tasks defined for the bot to perform can correspond to the capability of the bot. For example, roles and responsibilities can be defined for the bot (e.g., the bot handles address updates, password updates, assisting with user information). Bot task-management can include routing messages received from network devices to terminal devices or bots, as described herein.

At block 1330, routing protocols can be defined for routing messages to and from the bots. For example, the communication server can execute the routing protocols to determining which messages from users are to be routed to the bot, escalation paths (e.g., from bot, to live agent, to supervisor), specific campaigns that define when to trigger bot communication and when to trigger live agent communication, and so on.

At block 1340, the task-completion parameters (e.g., performance metrics) of the bot can be evaluated by generating quality scores for each bot. In some implementations, the performance of the bot can be evaluated by assessing the message parameters (e.g., meaningful connection score (MCS) score) associated with the bot. For example, if users have consistently been frustrated with a particular bot, the message parameter associated with the bot may be low. A low message parameter may indicate that the bot should be reprogramed or taken offline. At block 1350, protocols for communicating with users can be enhanced. For example, bots can be reprogrammed, or bots can be decommissioned if the bots no longer serve a purpose (e.g., specialized capabilities are no longer needed). Enhancing a protocol for communication with users can include modifying the bot script that is executed to implement the autonomous bot, optimizing a feature or aspect of the bot, such as improving routing protocols, or communication scripts, and other suitable enhancements.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
receiving a message during a communication session, wherein the message is associated with a user;
routing the message and additional messages of the communication session to a bot;
identifying an anchor in the communication session, wherein the anchor includes a string of text associated with a polarity, and wherein the polarity corresponds to a positive sentiment or a negative sentiment;
determining a message parameter using the anchor;
comparing in real-time the message parameter of the communication session to a threshold;
automatically transferring the communication session upon determining the message parameter satisfies the threshold, wherein when the message parameter satisfies the threshold, the communication session is transferred from the bot to an agent;
determining a parameter value associated with the message, wherein the parameter value includes the anchor;
predicting a response to the message by inputting the parameter value into a machine-learning model to determine a selected message, wherein the machine-learning model is trained using values of anchors associated with candidate messages; and facilitating displaying the selected message, wherein when the selected message is selected by the agent, the selected message is automatically added to the communication session.

2. The computer-implemented method of claim 1, wherein:

the parameter value includes a number of words, a number of messages exchanged, a number of characters, or a number of non-word characters.

3. The computer-implemented method of claim 1, wherein the message parameter is a dynamic sentiment parameter.

4. The computer-implemented method of claim 1, wherein the message parameter uses a characteristic of previous messages in previous communication sessions.

5. The computer-implemented method of claim 1,
wherein predicting the response to the message comprises grouping the candidate messages into a cluster, and
the method further includes determining a similarity between the message and the candidate messages in the cluster by executing a confidence algorithm to determine a confidence score.

6. The computer-implemented method of claim 1, further comprising:

collecting a data set for training the machine-learning model, wherein collecting the data set includes storing previous messages included in previous communication sessions between network devices and terminal devices.

7. The computer-implemented method of claim 1, further comprising:

collecting agent responses to messages in previous communication sessions between network devices and terminal devices.

8. The computer-implemented method of claim 1, further comprising:

transmitting the selected message; and updating one or more databases with training data associated with the message and the selected message.

9. The computer-implemented method of claim 1, further comprising:

evaluating performance of the bot using the message parameter.

10. The computer-implemented method of claim 1, further comprising:

reprogramming the bot to enhance future communication sessions.

11. The computer-implemented method of claim 1, further comprising:

training the machine-learning model using the selected message and a feedback signal.

12. The computer-implemented method of claim 1, further comprising:

determining a new parameter value associated with a new message, wherein the new parameter value includes a new anchor different from the anchor; and predicting a new response to the new message by inputting the new parameter value into the machine-learning model to determine a second message, wherein the second message is different from the selected message.

13. A system comprising:

one or more data processors; and a non-transitory computer-readable storage medium containing instructions which, when executed on the one or more data processors, cause the one or more data processors to perform a method including:

receiving a message during a communication session, wherein the message is associated with a user;

routing the message and additional messages of the communication session to a bot;

identifying an anchor in the communication session, wherein the anchor includes a string of text associated with a polarity, and wherein the polarity corresponds to a positive sentiment or a negative sentiment;

determining a message parameter using the anchor;

comparing in real-time the message parameter of the communication session to a threshold;

automatically transferring the communication session upon determining the message parameter satisfies the threshold, wherein when the message parameter satisfies the threshold, the communication session is transferred from the bot to an agent;

determining a parameter value associated with the message, wherein the parameter value includes the anchor;

predicting a response to the message by inputting the parameter value into a machine-learning model to determine a selected message, wherein the machine-learning model is trained using values of anchors associated with candidate messages; and facilitating displaying the selected message, wherein when the selected message is selected by the agent, the selected message is automatically added to the communication session.

14. The system of claim 13, wherein:

the parameter value includes a number of words, a number of messages exchanged, a number of characters, or a number of non-word characters.

15. The system of claim 13, wherein the method further includes:

reprogramming the bot to enhance future communication sessions.

16. A computer-program product tangibly embodied in a non-transitory machine-readable storage medium, including instructions configured to cause a data processing apparatus to perform a method including:

receiving a message during a communication session, wherein the message is associated with a user;

routing the message and additional messages of the communication session to a bot;

identifying an anchor in the communication session, wherein the anchor includes a string of text associated with a polarity, and wherein the polarity corresponds to a positive sentiment or a negative sentiment;

determining a message parameter using the anchor;

comparing in real-time the message parameter of the communication session to a threshold;

automatically transferring the communication session upon determining the message parameter satisfies the threshold, wherein when the message parameter satisfies the threshold, the communication session is transferred from the bot to an agent;

determining a parameter value associated with the message, wherein the parameter value includes the anchor;

predicting a response to the message by inputting the parameter value into a machine-learning model to determine a selected message, wherein the machine-learning model is trained using values of anchors associated with candidate messages; and facilitating displaying the selected message, wherein when the selected message is selected by the agent, the selected message is automatically added to the communication session.

17. The computer-program product of claim 16, wherein the method further includes:
   evaluating performance of the bot using the message parameter.

18. The computer-program product of claim 16, wherein the method further includes:
   reprogramming the bot to enhance future communication sessions.

19. The computer-program product of claim 16, wherein the method further includes:
   training the machine-learning model using the selected message and a feedback signal.

20. The system of claim 13, wherein the method further includes:
   determining a new parameter value associated with a new message, wherein the new parameter value includes a new anchor different from the anchor; and
   predicting a new response to the new message by inputting the new parameter value into the machine-learning model to determine a second message, wherein the second message is different from the selected message.

* * * * *